United States Patent
Schillings et al.

(10) Patent No.: US 11,299,416 B2
(45) Date of Patent: Apr. 12, 2022

(54) GRAVITY BENDING MOULD FOR BENDING GLASS PANES WITH CURVED SUPPORT SURFACE

(71) Applicant: SAINT-GOBAIN GLASS FRANCE, Courbevoie (FR)

(72) Inventors: Peter Schillings, Eschweiler (DE); Arnaud Borderiou, Compiegne (FR); Arthur Palmantier, Aachen (DE); Achim Zeichner, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 391 days.

(21) Appl. No.: 16/604,057

(22) PCT Filed: Mar. 15, 2018

(86) PCT No.: PCT/EP2018/056470
§ 371 (c)(1),
(2) Date: Oct. 9, 2019

(87) PCT Pub. No.: WO2018/188887
PCT Pub. Date: Oct. 18, 2018

(65) Prior Publication Data
US 2020/0156984 A1    May 21, 2020

(30) Foreign Application Priority Data
Apr. 10, 2017 (EP) .................. 17165666

(51) Int. Cl.
*C03B 23/025* (2006.01)
*C03B 23/03* (2006.01)

(52) U.S. Cl.
CPC .......... *C03B 23/0252* (2013.01); *C03B 23/03* (2013.01)

(58) Field of Classification Search
CPC .......................................... C03B 23/025–027
See application file for complete search history.

(56) References Cited

U.S. PATENT DOCUMENTS

| 3,060,708 A | 10/1962 | Stickel |
| 3,560,182 A * | 2/1971 | Golightly ............ C03B 23/0252 65/107 |

(Continued)

FOREIGN PATENT DOCUMENTS

| CN | 1187173 A | 7/1998 |
| CN | 1768011 A | 5/2006 |

(Continued)

OTHER PUBLICATIONS

JP 2014-051417 A (Takatsu) Mar. 20, 2014 (English language machine translation). [online] [retrieved Jan. 6, 2022], Retrieved from: Espacenet. (Year: 2014).*

(Continued)

*Primary Examiner* — Erin Snelting
(74) *Attorney, Agent, or Firm* — Pillsbury Winthrop Shaw Pittman LLP (57) ABSTRACT

A gravity bending mould for bending glass panes, includes a frame-like support surface that is suitable for arranging a glass pane thereon and that has an outer edge and an inner edge, wherein the support surface has an outer region facing the outer edge, an inner region facing the inner edge, and a central region between the outer region and the inner region, and wherein the outer region is planar and horizontal, the central region is inclined toward the inner edge and is planar or curved, and the inner region has a curvature in the opposite direction to the curvature of the glass pane, and (Continued)

wherein the inner region is more strongly curved than the central region.

20 Claims, 3 Drawing Sheets

(56) References Cited

U.S. PATENT DOCUMENTS

| | | | | |
|---|---|---|---|---|
| 3,560,183 | A * | 2/1971 | Stilley | C03B 23/0252 65/107 |
| 5,591,245 | A * | 1/1997 | Salonen | C03B 23/0252 65/103 |
| 5,882,370 | A | 3/1999 | Garner et al. | |
| 2004/0107729 | A1 | 6/2004 | Fukami et al. | |
| 2004/0129028 | A1 * | 7/2004 | Balduin | C03B 23/0357 65/106 |
| 2004/0226318 | A1 | 11/2004 | Schwartz et al. | |
| 2005/0268661 | A1 * | 12/2005 | Yoshizawa | C03B 23/0307 65/103 |
| 2007/0039354 | A1 | 2/2007 | Ollfisch et al. | |
| 2008/0134721 | A1 | 6/2008 | Maeda | |
| 2012/0291490 | A1 * | 11/2012 | Yamakawa | C03B 23/035 65/29.19 |
| 2013/0000356 | A1 | 1/2013 | Judkins et al. | |

FOREIGN PATENT DOCUMENTS

| | | |
|---|---|---|
| EP | 0 531 152 A2 | 3/1993 |
| EP | 0 571 162 A1 | 11/1993 |
| EP | 1 371 616 A1 | 12/2003 |
| EP | 1 836 136 B1 | 9/2007 |
| GB | 813069 A | 5/1959 |
| GB | 822984 A | 11/1959 |
| JP | H08-295522 A | 11/1996 |
| JP | H11-263634 A | 9/1999 |
| JP | 2000-327354 A | 11/2000 |
| JP | 2004-203676 A | 7/2004 |
| JP | 2014-051417 A | 3/2014 |
| WO | WO 2006/072721 A1 | 7/2006 |
| WO | WO 2008/068526 A1 | 6/2008 |
| WO | WO 2008/095455 A1 | 8/2008 |

OTHER PUBLICATIONS

International Search Report as issued in International Patent Application No. PCT/EP2018/056470, dated Jun. 19, 2018.
Columbian Office Action as issued in Columbian Application No. NC2019/0007756, dated Nov. 30, 2020.

* cited by examiner

GRAVITY BENDING MOULD FOR BENDING GLASS PANES WITH CURVED SUPPORT SURFACE

CROSS-REFERENCE TO RELATED APPLICATIONS

This application is the U.S. National Stage of PCT/EP2018/056470, filed. Mar. 15, 2018, which in turn claims priority to European patent application number 17165666.3 filed Apr. 10, 2017. The content of these applications are incorporated herein by reference in their entireties.

The invention relates to a gravity bending mould for bending glass panes and a gravity bending method carried out therewith.

Glazings for motor vehicles typically have a bend. A common method for bending glass panes is the so-called "gravity bending method" (also known as sag bending). Therein, the glass pane, planar in the initial state, is arranged on the support surface of a mostly frame-like bending mould. The pane is then heated to at least its softening temperature such that the center of the pane drops, under the influence of gravity, creating the bend. The final bend can be achieved by gravity bending. Such a method is known, for example, from GB 813069 A. However, in the case of more complex pane shapes, multistage bending methods are frequently used. Typically, a pre-bend is produced in a first bending step by means of gravity bending, whereas the final shape is produced in a second bending step—frequently by press bending between two complementary bending moulds. Such multistage bending methods are known, for example, from EP 1 836 136 B1, US 2004107729 A1, EP 0531152 A2, and EP 1371616 A1.

Conventional gravity bending moulds have a frame-like or ring-like support surface, which is in contact with a circumferential edge region of the glass pane. There, the support surface is planar and inclined inward, in order to roughly match the final shape of the glass pane. This shape of the support surface can, however, create markings on the glass pane and, thus, negatively affect the quality of the glass panes. When the glass, planar in the initial state, is placed on the support surface, it initially makes contact only with the outer edge of the support surface, since, due to the inclination of the support surface, this outer edge is positioned highest. This substantially linear contact between the bending mould and the glass pane can result in a high compressive load, as a result of which the markings develop. Likewise, it can occur that the glass pane rests in the final bent state only on the inner edge of the support surface, with impressions also possibly developing.

Also known are more complex gravity bending tools, with which the pane quality can be improved and, in particular, strong pane curvatures can be produced. Thus, WO2008068526A1, U.S. Pat. No. 5,882,370A, and US2008134721A1, for example, disclose gravity bending moulds with articulated edge regions. The edge regions are initially positioned downward such that the gravity bending mould is relatively flat when the planar pane is placed thereon and are pivoted upward with increasing pane curvature in order to gently realise a stronger curvature in the edge region. The tools are, however, very complex with joints and means for producing the pivoting movement, which increases production, maintenance intensity, and susceptibility to errors.

The object of the present invention is to provide an improved gravity bending mould, with which the glass pane quality is improved, in particular, mould markings are avoided without more complex bending methods being necessary.

The object is accomplished according to the invention by a gravity bending mould in accordance with the independent claim 1. Preferred embodiments emerge from the dependent claims.

The gravity bending mould for bending glass panes according to the invention has a frame-like support surface that is suitable for arranging a glass pane thereon. The gravity bending mould is a so-called lower mould on which the pane can be placed such that the upward-facing support surface touches the lower surface of the glass pane facing the ground. Only an edge region of the glass pane is in direct contact with the frame-shaped or frame-like support surface, whereas most of the glass pane has no direct contact with the bending mould. Such a bending mould can also be referred to as a ring (bending ring) or frame (frame mould). The support surface need not necessarily form a complete frame, but can also be discontinuous. The support surface is implemented in the form of a complete or discontinuous frame.

The gravity bending mould can also be referred to as a bending tool. The term "support surface" refers to a surface facing substantially upward, away from the ground, that is intended to support the glass pane. The support surface is delimited by edges. During the bending operation, the entire support surface need not necessarily be in direct contact with the glass pane. Instead, there can be regions of the support surface that form a unified, substantially upward-facing surface with the actual contact regions, but do not come into direct contact with the glass pane.

The support surface has an outer edge and an inner edge that in each case run circumferentially in a frame-like manner. The inner edge is turned toward the center and faces the center of the glass pane in the intended use. The outer edge points outward and faces the pane edge and faces away from the center of the glass pane in the intended use. The circumferential side edge of the glass pane can be arranged on the support surface or even protrude beyond the support surface in sections or circumferentially.

In contrast to conventional gravity bending moulds, the support surface is not completely planar, but is partially curved. The support surface according to the invention has an outer, a central, and an inner region. The regions are also implemented frame-like, with the outer region surrounding the central region, which, in turn, surrounds the inner region. The outer region faces the outer edge; the inner region faces the inner edge; and the central region is arranged between the outer region and the inner region. In a cross-section through the gravity bending mould, the regions are discernible between the outer edge and the inner edge of the support surface, with, arranged starting from the outer edge in the direction of the inner edge, first the outer region, then the central region, and then the inner region.

The outer region of the support surface is planar according to the invention. The central region can be planar or slightly curved. The inner region has, in contrast, a relatively strong curvature, in the direction opposite the curvature of the glass pane produced during the gravity bending operation. Since the center of the pane drops under the influence of gravity and the pane edges are raised relative to the center of the pane, the glass pane is bent during gravity bending such that the lower pane surface is convexly curved and the upper pane surface is concavely curved. Referred to here as the "lower pane surface" is that primary surface of the glass that faces the bending mould and the ground, whereas the "upper pane surface" refers to that primary surface of the glass pane that faces away from the bending mould and points upward. The inner region of the support surface according to the invention is, consequently, convexly curved such that the curvature of the second region and the curvature of the glass pane are in the opposite direction to one another.

The height of the support surface decreases in the central and inner region in the direction from the outer edge to the inner edge. The shaping of the support surface according to the invention prevents the glass pane from resting only on the edges of the support surface. Instead, the glass pane initially rests flat on the outer region; and after the onset of bending, flat on the central region. The risk of creation of bothersome mould markings can thus be effectively avoided. Such markings can reduce the quality of the glass pane or even make it completely unusable. When the glass pane that is planar in the initial state is placed on the support surface, it initially makes contact only with the planar outer region, which is positioned highest. The outer region thus provides a large area contact region for the glass pane before the bending operation, in contrast to conventional support surfaces with which the glass pane initially rests only on the outer edge. After the onset of bending of the heated pane, the contact region between the support surface on the glass pane shifts as a result of the dropping of the central region of the glass pane onto the central region of the support surface, where the glass pane again rests flat after bending is done. The inner edge of the support surface does not come into contact with the glass pane, which is ensured by the strongly curved inner region. Mould markings can, in turn, be avoided due to lack of contact between the inner edge and the glass pane.

The support surface according to the invention thus increases the quality of the bent glass panes by avoiding mould markings first in the initial state and subsequently in the final bend state. At the same time, no complicated adjustments of the bending devices and methods are necessary. The support frame of existing devices must merely be replaced by the one according to the invention. Thus, the invention can be easily integrated into existing plants and operations. These are major advantages of the present invention.

The planar outer region is advantageously arranged horizontally. It lies, as a whole, in a horizontal flat plane such that the glass can be placed thereon and safely stored thereon.

The central region is inclined inward, i.e., toward the inner edge, such that height of the support surface in the central region decreases from the outside to the inside. The central region can be planar or curved, with the curvature less pronounced than in the inner region of the support surface. The central region, if curved, is preferably convexly curved such that it has a curvature in the direction opposite to the curvature of the glass pane, as does the inner region.

The outer region, the central region, and the inner region of the support surface can be directly adjacent one another in this order. However, the occurrence of sharp edges, for example, between a planar outer region and a planar central region should be avoided. The transitions between the regions should be smooth and curved. Transition regions can also be arranged between the regions. The function is, in principle, fulfilled even if the regions are separated from one another, for example, by depressions. However, no regions that protrude beyond the outer region should exist between the outer and the central region or between the central and the inner region. Overall, the outer region should be the highest positioned region of the support surface.

The outer region preferably adjoins the outer edge of the support surface directly. The inner region preferably adjoins the inner edge of the support surface directly. Then, the function is ideally fulfilled. However, it is, in principle, also conceivable for other regions to be arranged between the inner or outer region and the respective edge, in particular those which intentionally do not come into contact with the glass pane. These other regions would, however, make no contribution to the function of the support surface according to the invention. For example, the support surface could also have, between the planar outer region and the outer edge, a sloping region or a planar sloping region between the curved inner region and the inner edge.

The inner region is more strongly curved than the central region, i.e., has a smaller radius of curvature. The extent of the required curvature of the inner region of the support surface depends substantially on the geometry of the glass pane to be bent and can be determined by conventional technical calculations during planning of the bending tool. The curvature of the inner region is, in particular, selected such that in the final bent state, the glass pane does not touch the inner edge.

In a preferred embodiment, the radius of curvature in the inner region is at most 200 mm, particularly preferably from 20 mm to 100 mm. The radius of curvature in the central region is preferably at least 200 mm, particularly preferably at least 400 mm. Under these conditions, particularly good results are obtained with customary pane bends.

The radius of curvature can be constant in each case in the central region and in the inner region such that the radius of curvature changes more or less abruptly at the transition between the regions. It can be advantageous for the radius of curvature of the inner region and/or of the central region to decrease, at least in sections, in the direction from the outer edge to the inner edge. Thus, in a cross-section from the outer edge to the inner edge, there exists at least one section of the respective region in which the curvature becomes stronger from the outside toward the inside. As a result, the inner edge of the support surface is lowered farther and the risk of contact between the inner edge and the glass edge is further reduced. The section with a decreasing radius of curvature preferably adjoins the inner edge directly such that the minimum radius of curvature appears at the inner edge—and only there.

The support surface preferably has a width from 3 cm to 20 cm, particularly preferably from 5 cm to 15 cm. Such widths are customary for the support surface of gravity bending moulds. The term "width" refers to the dimension of the support surface along the shortest connection between the outer edge and the inner edge, in particular substantially perpendicular to the two edges.

During gravity bending, it is the central region that primarily acts on the glass pane; consequently, the central region should make up the greater part of the support surface. The width of the central region is preferably at least 50% of the width of the support surface, particularly preferably at least 70%, most particularly preferably from 80% to 90%.

The width of the planar outer region of the support surface should be at least 5 mm, preferably from 5 mm to 20 mm. This ensures a stable initial positioning on the support surface, and the pressure is distributed over an adequately large area to avoid mould markings. The width of the curved inner region of the support surface should be at least 2 mm, preferably from 2 mm to 10 mm.

The support surface of the gravity bending mould can be covered with a fabric, in particular a metal-containing fabric.

This serves, on the one hand, for padding in order to further reduce the risk of mould markings and, on the other, for thermal insulation in order to reduce cooling of the glass pane by the gravity bending mould.

The invention also includes a device for gravity bending of glass panes, comprising a gravity bending mould according to the invention, means for heating a glass pane, and means for arranging the glass pane on the gravity bending mould. The glass pane can, for example, pass through a tunnel furnace, for example, by means of rollers, where it is heated and subsequently picked up by a transport mould and placed on the gravity bending mould. Alternatively, the glass pane can also be placed on the gravity bending mould and transported together with it through the furnace to the bending station.

The means for arranging the glass pane on the gravity bending mould is, in particular, an upper transport mould with a downward oriented contact surface. The glass pane is sucked or blown onto the contact surface. The gravity bending mould is moved under the transport mould (or, alternatively, the transport mould is moved over the gravity bending mould), optionally, brought closer to the transport mould, and the glass pane is placed on the support surface of the gravity bending mould by switching off the suction or blowing action. The contact surface of the transport mould is preferably planar, as a result of which the glass pane, which is planar in the initial state, can be optimally transported.

The device is advantageously designed for a multistage glass bending operation in which the glass pane is first pre-bent by gravity bending on the gravity bending mould and subsequently brought into the final shape by press bending. For this purpose, the device has an upper press-bending mould with a downward-facing contact surface and a lower press-bending mould with an upward-facing contact surface, between which the glass pane is pressed. The lower press bending mould preferably also has a frame-like contact surface.

The device can specifically include means for moving the glass pane from the gravity bending mould onto the lower press-bending mould, for example, a further upper transport mould. In an advantageous embodiment, the gravity bending mould and the lower press-bending mould are combined in a common tool, wherein the contact surface of the lower press-bending mould frames the support surface of the gravity bending mould or vice versa. The contact surface of the lower press-bending mould and the support surface of the gravity bending mould are movable relative to one another by vertical displacement such that a change can be made between a first state, in which the support surface of the gravity bending mould is arranged higher than the contact surface of the lower press-bending mould, and a second state, in which the contact surface of the lower press-bending mould is arranged higher than the support surface of the gravity bending mould. When the glass pane has been pre-bent in the first state on the gravity bending mould, it can be transferred in a simple manner onto the lower press-bending mould by transition into the second state.

During press bending, the side edge of the glass pane makes contact along a contact line on the contact surface of the lower press-bending mould. The contact line migrates during the pressing operation from the first contact line all the way to a pressing line (is thus displaced on the contact surface). In a particularly advantageous development, the contact surface between the first contact line and the pressing line is convexly curved. The convex curvature of the contact surface is opposite the direction of curvature of the glass pane. The contact surface is thus, so to speak, bent away from the glass pane, by which means the primary pane surface is prevented from coming into contact with the contact surface. Instead, the linear contact along the side edge of the glass pane is ensured even in the case of strong pane curvatures. With the lower press-bending mould according to the invention, glass panes with strong curvature, in particular in the edge region, and high optical quality can be produced.

The lower press-bending mould has a contact surface that is frame-like. During the bending operation, it is not the entire contact surface that makes direct contact with the glass pane, but rather only the region between the first support line and the pressing line. The contact surface is not a so-called "solid mould", i.e., not a solid bending mould that is intended to come into contact with most of the glass pane. Instead, the contact surface is frame-like or frame-shaped and adapts to the contour of the glass pane to be bent such that is suitable for contacting the circumferential side edge of the glass pane. The lower surface of the glass pane has no direct contact with the contact surface, but only with its side edge.

Only the side edge of the glass pane comes into contact with the contact surface of the lower press-bending mould. The direct contact between the glass pane and the contact surface is thus linear or in the form of a line, with this line being referred to in the context of the invention as a "contact line". That contact line along which the glass pane first touches the contact surface when the moulds are brought close to one another before the onset of the reshaping is referred to in the context of the invention as the "first contact line". As soon as the actual press bending begins and the pane is reshaped, the side edge of the glass pane is displaced on the contact surface. As a result of the increasing curvature of the glass pane, the contact line migrates inward away from the outer boundary edge of the frame-like contact surface. When, upon completion of the press bending, after reaching the final pane shape, the bending moulds have reached their final position, the contact line has been maximally displaced and has reached its most inward position. In the context of the invention, this contact line is referred to as the "pressing line". The direct contact between the glass pane and the lower bending mould during the entire bending operation is always linear along the contact line. The lower pane surface never comes into contact with the lower bending mould.

The contact surface of the lower press-bending mould has at least one section in which it is convexly curved at least in the region between the first contact line and the pressing line. The glass pane is pressed into the lower press-bending mould by the upper press-bending mould such that the center of the pane drops and the pane edges are raised relative to the center of the pane. The glass pane is thus bent such that the lower pane surface is convexly curved and the upper pane surface is concavely curved. The contact surface is convexly curved such that the curvature of the contact surface and the curvature of the glass pane are in the direction opposite to one another. The height of the contact surface decreases in the direction from the outer edge to the inner edge. The inner region of the contact surface is thus bent away from the glass pane, so to speak, such that the contact surface is prevented from touching the lower pane surface even with strong pane bends.

The curvature is selected such that the lower pane surface does not touch the contact surface even in the final bent state. The lower pane surface and the contact surface should thus always enclose an angle greater than 0°, referred to in the context of the invention as a "clearance angle". Due to the pane curvature, the respective tangential plane on the contact line must be used for the exact determination of the clearance angle. The clearance angle between the glass pane and the contact surface at the pressing line is preferably at least 3°, particularly preferably at least 5°, for example, from 5° to 8°. Thus, the pane surface and the contact surface are spaced sufficiently apart to effectively rule out direct contact, even under consideration of production tolerances. The radius of curvature of the contact surface between the first contact line and the pressing line should advantageously be 750 mm at most, preferably 500 mm at most. With these values, with conventional radii of curvature of the glass pane to be bent, good results are achieved and an adequate clearance angle is ensured.

The upper press-bending mould is, in an advantageous embodiment, implemented as a so-called "solid mould", i.e., has a full-surface downward-facing contact surface or active surface. In contrast to a frame bending mould, such an active surface, which can also be referred to as "solid", makes contact, at the end of the bending step, with most of the upper pane surface—or even the entire upper pane surface. A solid upper press-bending mould is particularly suitable for press bending in connection with a frame-like lower press-bending mould. The active surface of the upper press-bending mould is, in particular, convex and has a geometry that corresponds to that of the final bent pane.

The invention also includes an arrangement for bending glass panes, comprising the gravity bending mould according to the invention or the device according to the invention and a glass pane arranged on the support surface of the gravity bending mould.

The invention further includes a method for bending glass panes, at least comprising the following steps:
(a) Heating a glass pane to at least its softening temperature and arranging the glass pane on the support surface of a gravity bending mould according to the invention, more precisely, on the planar outer region of the support surface;
(b) Gravity bending the glass pane;
(c) Cooling the glass pane.

The heating of the glass pane can be done before or after the arranging on the gravity bending mould. During the gravity bending, the contact region between the glass pane and the support surface migrates from the outer region of the support surface into the planar or slightly curved central region, where it rests flat. The contact region does not, however, migrate all the way to the inner edge of the contact surface, which is not touched by the glass pane.

The glass pane to be bent preferably contains soda lime glass, as is customary for window panes, but can, however, also contain other types of glass, such as borosilicate glass or quartz glass. The thickness of the glass pane is typically from 0.5 mm to 10 mm, preferably 1 mm to 5 mm.

Typical temperatures for bending glass panes are from 500° C. to 700° C., in particular approx. 650° C. with the bending of panes made of soda lime glass.

The cooling of the glass pane can be done on the gravity bending mould or even on another mould, onto which the pane is transferred. The cooling can be done at ambient temperature or by active cooling. The gravity bending mould according to the invention is particularly suitable for producing bent, prestressed glass panes, as are common, for example, as side windows or rear windows of motor vehicles. Consequently, in a preferred embodiment, the glass pane is thermally prestressed by rapid cooling after bending. For this purpose, the glass pane is transferred after bending to a so-called "tempering frame", on which it is stored during the prestressing operation.

The method is preferably a multistage bending method, wherein the glass pane is pre-bent by gravity bending and subsequently brought to the final shape by press bending. For this purpose, the glass pane is transferred from the gravity bending mould to a lower press-bending mould after gravity bending. The press bending is done between the lower press-bending mould and a complementary upper press-bending mould.

With regard to preferred embodiments, the statements made above in connection with the device for bending glass panes apply.

The invention also includes the use of a gravity bending mould according to the invention for gravity bending of glass panes for means of transportation for travel on land, in the air, or on water, preferably for gravity bending of window panes of rail vehicles or motor vehicles, in particular for gravity bending of rear windows, side windows, or roof panels of passenger cars.

In the following, the invention is explained in detail with reference to drawings and exemplary embodiments. The drawings are schematic representations and are not to scale. The drawings in no way restrict the invention.

They depict.

Figure 1:
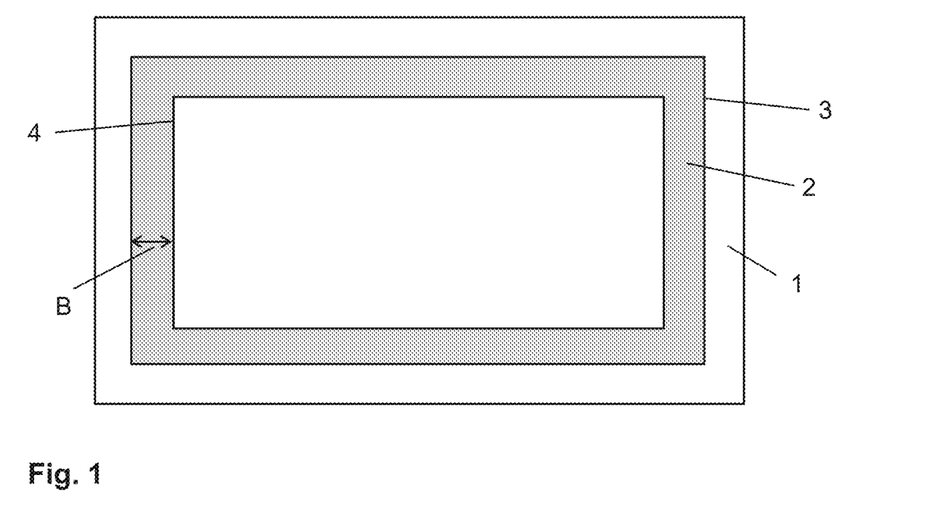
FIG. 1 a plan view of a generic gravity bending mould,
FIG. 2 a cross-section through a generic gravity bending mould during the gravity bending of a glass pane,
FIG. 3 a cross-section through a section of a gravity bending mould according to the invention,
FIG. 4 a cross-section through the section of FIG. 3 during the gravity bending of a glass pane,
FIG. 5 for comparison, a cross-section through a section of a conventional gravity bending mould during the gravity bending of a glass pane, and
FIG. 6 a flowchart of an embodiment of the method according to the invention.

FIG. 1 depicts a plan view of a generic gravity bending mould 1. The frame-like contact surface 2 is delimited by a circumferential outer edge 3 and a circumferential inner edge 4. The width B of the support surface 2 is, for example, approx. 10 cm. The support surface 2 makes contact with a circumferential edge region of a glass pane to be bent during the bending operation.

Figure 2:
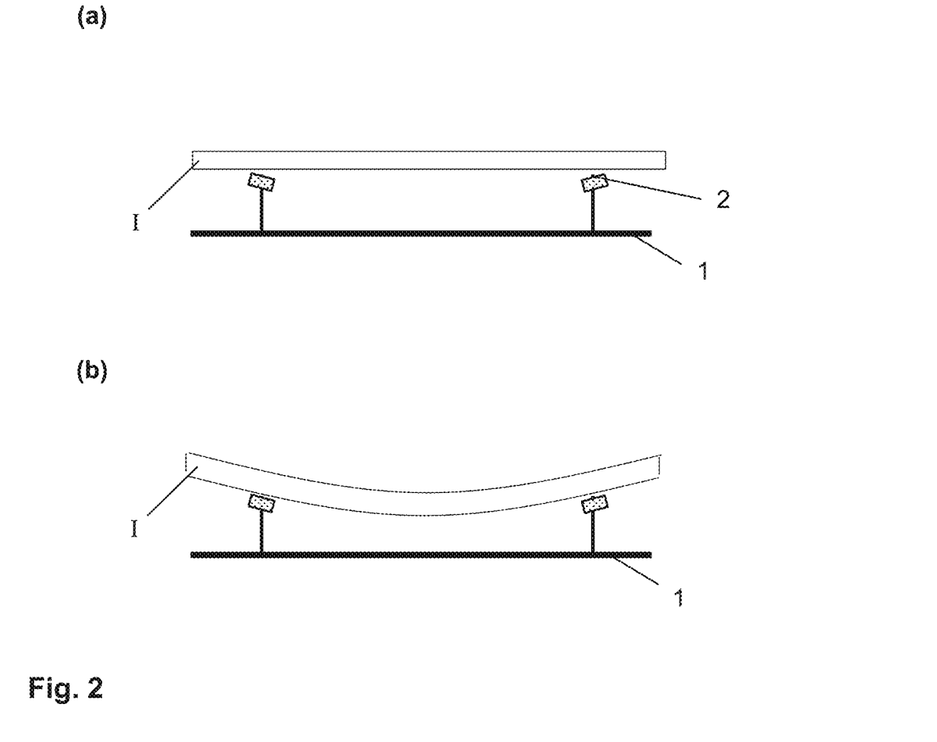

FIG. 2 depicts a generic gravity bending mould 1 in the intended use. A glass pane I. planar in the initial state, is placed on the support surface 2 (FIG. 2*a*). The glass pane I is then heated such that is softened and reshapable. The pane center, which is not supported by the gravity bending mould 1, sags under the influence of gravity, by which means the bending of the pane is achieved (FIG. 2*b*).

Figure 3:
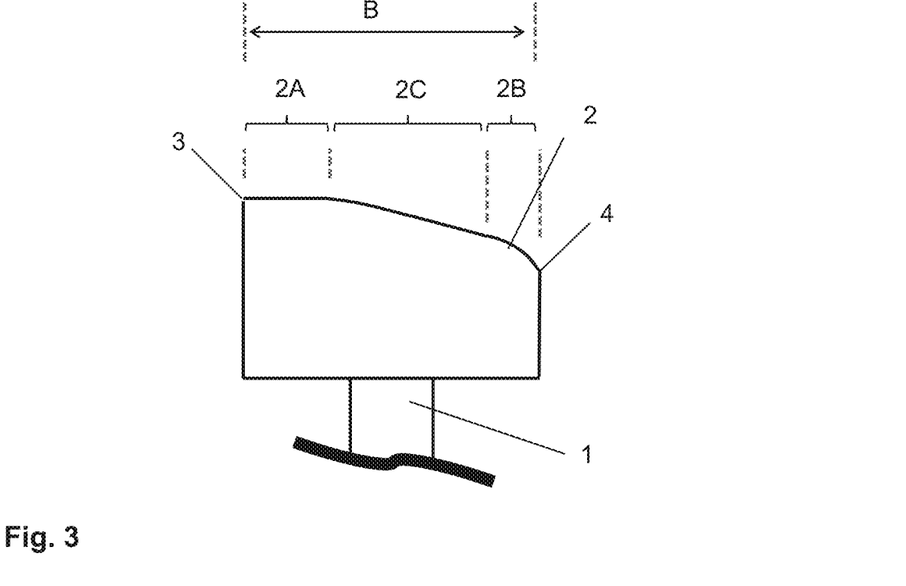

FIG. 3 depicts a detail of a section of a gravity bending mould 1 according to the invention. The support surface 2 is inclined and not completely planar, as has been customary until now. It consists of three regions: an outer region 2A, a central region 2C, and an inner region 2B. The outer region 2A is planar and horizontal and adjoins the outer edge 3. The central region 2C is planar and inclined inward, but can also be slightly curved, in particular convexly curved. The inner region 2B adjoins the inner edge 4 and is convexly curved. Due to the inclination of the central region 2C and the curvature of the inner region 2B, the height of the support surface 2 decreases starting from the outer region 2A all the way to the inner edge 4.

The width B of the support surface 2 is, for example, 100 mm; the width of the outer region 2A, for example, 15 mm; the width of the central region 2C, for example, 80 mm, and the width of the inner region 2B, for example, 5 cm. The central region 2C, which acts on the glass pane I during gravity bending, accounts for approx. 80% of the width B of the support surface 2. The outer region 2A, on which the glass pane I initially rests, accounts for approx. 15% of the width B. The inner region 2B is not involved in the actual bending and merely ensures that the inner edge 4 does not come into contact with the glass pane I—it accounts for only 5% of the width B.

Figure 4:
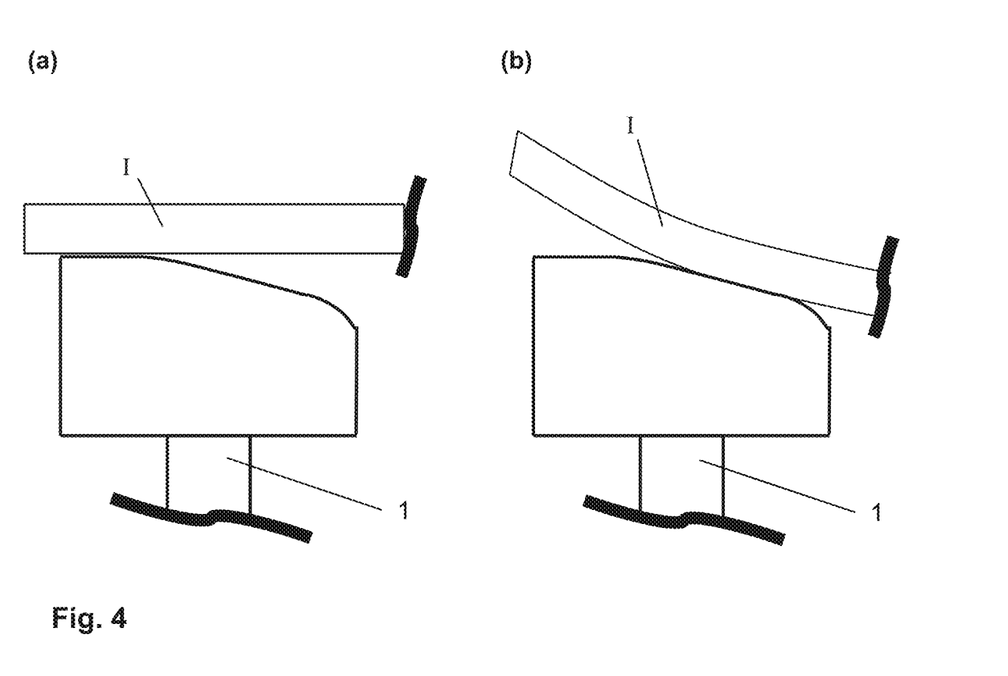

FIG. 4 depicts said section of the gravity bending mould 1 according to the invention during the gravity bending. The glass pane I, planar in the initial state, is placed on the planar, horizontal outer region 2A of the support surface 2 (FIG. 4a). Since the contact force is distributed over a relatively large area, only relatively little pressure is exerted on the glass pane I by the gravity bending mould 1 such that the risk of mould markings is reduced. When, after softening, the glass pane I begins to bend under the influence of gravity, the contact region between the glass pane I and the support surface 2 migrates in the direction of the inner edge 4 to the central region 2C. Due to the opposite curvature of the glass pane I and the inner region 2C, the glass pane I does not come into contact with the inner edge 4, which could, in turn, produce tool markings. Overall, the optical quality of the glass pane I is increased by the support surface 2 according to the invention.

Figure 5:
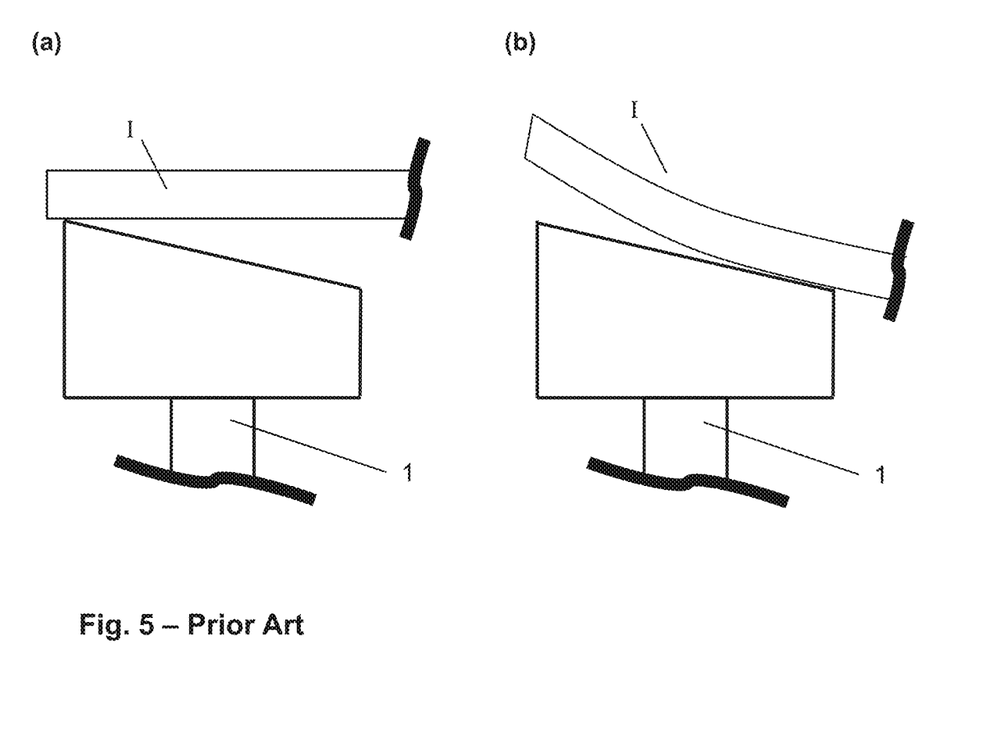

FIG. 5 depicts, for comparison, a corresponding section of a conventional gravity bending mould 1. The support surface is planar and inclined inward. The plane glass pane I is first placed on the outer edge. The bent glass pane I rests on the inner edge. Both before and after bending, the glass pane thus rests on an edge of the support surface, as a result of which the contact force is highly concentrated; consequently, high pressure is exerted. Thus, undesirable tool markings can develop, reducing the optical quality of the glass pane I.

Figure 6:
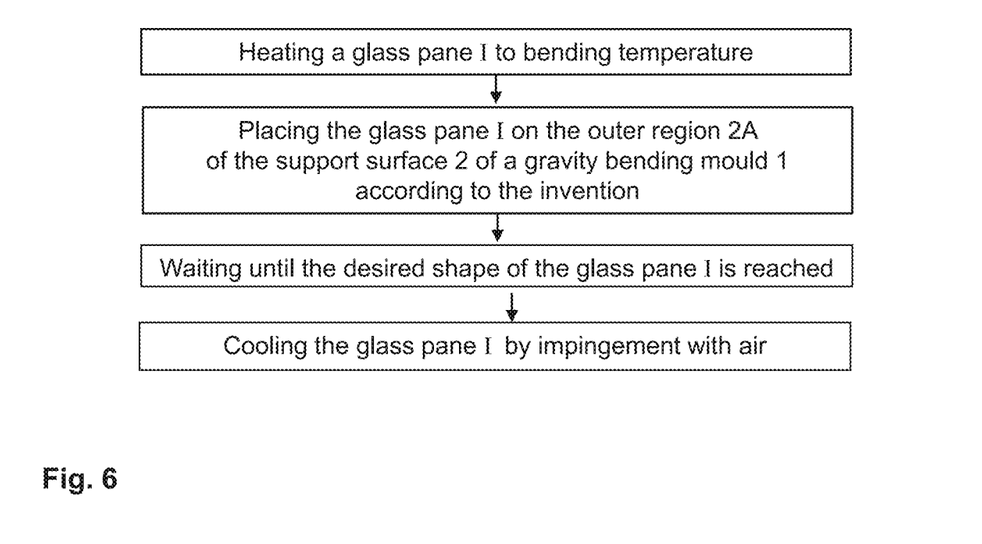

FIG. 6 depicts an exemplary embodiment of the method according to the invention with reference to a flowchart.

LIST OF REFERENCE CHARACTERS (1) gravity bending mould
(2) support surface of the gravity bending mould 1
(2A) outer region of the support surface 2
(2B) inner region of the support surface 2
(3) outer edge of the support surface 2
(4) inner edge of the support surface 2
(B) width of the support surface 2
(I) glass pane

The invention claimed is:

1. Gravity bending mould for bending glass panes, comprising a frame-like support surface that is suitable for arranging a glass pane thereon and that has an outer edge and an inner edge,
   wherein the support surface has an outer region facing the outer edge, an inner region facing the inner edge, and a central region between the outer region and the inner region,
   and wherein the outer region is planar and horizontal, the central region is inclined toward the inner edge and is planar or curved, and the inner region has a curvature in an opposite direction to a curvature of the glass pane, and wherein the inner region is more strongly curved than the central region.

2. The gravity bending mould according to claim 1, wherein the outer region adjoins the outer edge and the inner region adjoins the inner edge.

3. The gravity bending mould according to claim 1, wherein the curvature of the inner region is selected such that the glass pane does not touch the inner edge.

4. The gravity bending mould according to claim 1, wherein a radius of curvature in the inner region is at most 200 mm.

5. The gravity bending mould according to claim 4, wherein the radius of curvature in the inner region is from 20 mm to 100 mm.

6. The gravity bending mould according to claim 1, wherein a radius of curvature in the central region is at least 200 mm.

7. The gravity bending mould according to claim 6, wherein the radius of curvature in the central region is at least 400 mm.

8. The gravity bending mould according to claim 1, wherein a radius of curvature of the inner region and/or of the central region decreases, at least in sections, in a direction from the outer edge to the inner edge.

9. The gravity bending mould according to claim 1, wherein a width of the central region is at least 50% of a width of the support surface.

10. The gravity bending mould according to claim 1, wherein a width of the outer region is at least 5 mm.

11. The gravity bending mould according to claim 10, wherein the width of the outer region is from 5 mm to 20 mm.

12. The gravity bending mould according to claim 1, wherein a width of the inner region is at least 2 mm.

13. The gravity bending mould according to claim 12, wherein the width of the inner region is from 2 mm to 10 mm.

14. The gravity bending mould according to claim 1, wherein a width of the support surface is from 3 cm to 20 cm.

15. Device for bending glass panes, comprising a gravity bending mould according to claim 1, means for heating a glass pane, and means for arranging the glass pane on the gravity bending mould.

16. The device according to claim 15, further comprising an upper press-bending mould and a lower press-bending mould, wherein the lower press-bending mould and the gravity bending mould are combined in a common tool and are movable relative to one another by vertical displacement such that the glass pane can be transferred from the gravity bending mould onto the lower press-bending mould,
   and wherein the lower press-bending mould and the upper press-bending mould are suitable for reshaping the glass pane situated therebetween by pressing, wherein a side edge of the glass pane rests on a contact surface of the lower press-bending mould along a first contact line, which contact surface migrates during a pressing operation between the upper press-bending mould and the lower press-bending mould from the first contact line all the way to a pressing line, wherein the contact surface between the first contact line and the pressing line is convexly curved.

17. Method for bending glass panes, comprising:
   (a) heating a glass pane to at least its softening temperature and arranging the glass pane on the support surface of a gravity bending mould according to claim 1,
   (b) gravity bending the glass pane,
   (c) cooling the glass pane.

18. The method according to claim 17, wherein the glass pane does not touch the inner edge of the support surface.

19. A method comprising utilizing a gravity bending mould according to claim 1 for bending glass panes for means of transportation for travel on land, in the air, or on water.

20. The method according to claim 19, wherein the glass panes are window panes of rail vehicles or motor vehicles.

\* \* \* \* \*